United States Patent [19]
Chikuma

[11] Patent Number: 6,055,082
[45] Date of Patent: Apr. 25, 2000

[54] OPTICAL TRANSMISSION SYSTEM

[75] Inventor: Tadayuki Chikuma, Tokyo, Japan

[73] Assignee: NEC Corporation, Tokyo, Japan

[21] Appl. No.: 08/972,817

[22] Filed: Nov. 18, 1997

[30] Foreign Application Priority Data

Nov. 25, 1996 [JP] Japan .................................. 8-313594

[51] Int. Cl.[7] .................................................. H04B 10/00
[52] U.S. Cl. ......................... 359/161; 359/110; 359/134; 359/179; 359/177
[58] Field of Search ................................... 359/161, 110, 359/134, 124, 176–177, 179

[56] References Cited

U.S. PATENT DOCUMENTS

| | | | |
|---|---|---|---|
| 4,307,469 | 12/1981 | Casper et al. | 359/184 |
| 4,736,359 | 4/1988 | Cohen et al. | 359/114 |
| 4,972,513 | 11/1990 | Mochizuki et al. | 359/179 |
| 5,060,307 | 10/1991 | El-Sherif | 359/173 |
| 5,076,658 | 12/1991 | Hayden et al. | 385/1 |
| 5,172,260 | 12/1992 | Takatsu | 359/176 |
| 5,225,922 | 7/1993 | Chraplyvy et al. | 359/124 |
| 5,966,228 | 10/1999 | Akiba et al. | 359/161 |

FOREIGN PATENT DOCUMENTS

| | | |
|---|---|---|
| 1-120137 | 5/1989 | Japan . |
| 4-58736 | 9/1992 | Japan . |
| 6-224849 | 8/1994 | Japan . |
| 7-74699 | 3/1995 | Japan . |
| 7-79197 | 3/1995 | Japan . |
| 7-107069 | 4/1995 | Japan . |
| 7-128524 | 5/1995 | Japan . |
| 7-143060 | 6/1995 | Japan . |
| 7-202798 | 8/1995 | Japan . |
| 7-212304 | 8/1995 | Japan . |
| 7-245584 | 9/1995 | Japan . |
| 7-327012 | 12/1995 | Japan . |
| 7-336-300 | 12/1995 | Japan . |
| 8-340320 | 12/1996 | Japan . |
| 9-261173 | 10/1997 | Japan . |
| 9-326755 | 12/1997 | Japan . |

*Primary Examiner*—Kinfe-Michael Negash
*Attorney, Agent, or Firm*—Scully, Scott, Murphy and Presser

[57] ABSTRACT

In an optical transmission system in which an optical main signal and a monitoring control optical signal are wavelength-multiplexed and transmitted from a transmitter and the optical signal is directly amplified by a repeater and transmitted, low frequency pulse signals which are synchronized with the respective optical main signal and monitoring control signal are multiplexed with each others, a distance of a transmission section is specified by a phase difference between the low frequency pulse signals according to a difference in propagation rate of a transmission line due to a difference of wavelength between the optical main signal and the monitoring control signal and the optimal dispersion compensation is made possible even when a required dispersion compensation is changed due to a change of the transmission line by switching the optical transmission line to a DCF having an optimal amount of dispersion compensation.

5 Claims, 4 Drawing Sheets

OPTICAL TRANSMISSION SYSTEM

BACKGROUND OF THE INVENTION

1. Field of the Invention

The present invention relates to an automatic dispersion compensating optical transmission for performing an automatic dispersion compensation by a repeater in a long distance, light-based transmission in which an optical signal transmitted from mainly an optical transmitter through a transmission line is directly amplified by the repeater.

2. Description of Related Art

In a long distance, light-based transmission which uses a high dispersion optical fiber as a transmission line, a signal waveform distortion has occurred due to dispersion and a correct waveform transmission has become impossible. Therefore, an application of a dispersion compensation by means of a dispersion compensation device such as a dispersion compensating fiber (referred to as "DCF", hereinafter) has become indispensable. A required amount of dispersion compensation depends upon a distance of transmission and a dispersion characteristics of optical fiber.

An optical communication system disclosed in Japanese Patent Application Laid-open No. H7-202798 is one of examples of the known techniques related to the dispersion compensation in a long distance, light-based transmission. In this optical communication system, a long distance, light-based transmission rate is increased by making a length of the DCF used to dispersion compensation a half of a usual length of the DCF. Further, in an optical wavelength multiplex transmission system and an optical dispersion compensation system disclosed in Japanese Patent Application Laid-open No. H7-107069, a capacity of the optical communication system is increased by applying the dispersion compensation in order to realize the wavelength multiplex transmission.

In general, the amount of dispersion compensation of the DCF has to be set to an optimal value which depends upon a transmission distance thereof as mentioned above. Therefore, when the transmission line is switched to a preliminary line, it is necessary to set the amount of dispersion compensation again to an optimal value of the preliminary line by replacing the DCF. However, it is impossible in the conventional system to automatically switch between DCF'S.

Incidentally, since, in the case of the optical communication system disclosed in the aforementioned Japanese Patent Application Laid-open No. H7-202798, the length of the DCF used to compensate for the dispersion is made a half of the usual length, it can not be adapted to a case where the amount of dispersion of the transmission line is changed. Further, in the case of the dispersion compensation system disclosed in the aforementioned Japanese Patent Application Laid-open No. H7-107069, the dispersion compensation is applied for the wavelength multiplex transmission and it is impossible to control the amount of dispersion compensation correspondingly to the transmission lines.

SUMMARY OF THE INVENTION

An object of the present invention is to provide an automatic dispersion compensation type optical transmission system which allows an amount of dispersion compensation of a DCF to be set to an optimal value for each of transmission sections and can be adapted to an automatic switching of transmission lines.

According to the present invention, an automatic dispersion compensation type optical transmission system comprises an optical transmission unit for transmitting an optical signal to a transmission line and a repeater for directly amplifying the optical signal transmitted from the transmission line. The optical transmission unit includes optical transmitters for transmitting an optical main signal and a monitoring control optical signal, respectively, a low frequency signal multiplexing circuit for multiplexing low frequency pulse signals each synchronized with the optical main signal and the monitoring control optical signal, an optical preamplifier for directly amplifying the optical main signal and outputting the amplified optical main signal and a WDM coupler for wavelength-synthesizing the amplified optical main signal and the monitoring control optical signal and outputting the synthesized signal as an optical signal and the repeater includes an optical coupler for branching a portion of the optical signal for use to detect a phase difference between the optical main signal and the monitoring control optical signal, a WDM coupler for wavelength-separating the branched optical signal to the optical main signal and the monitoring control optical signal, opto-electric converter circuits for converting the optical main signal and the monitoring control optical signal of the optical signal into electric signals, respectively, a phase difference detector circuit for extracting the low frequency pulse signals multiplexed in the optical transmitting unit from the opto-electrically converted optical main signal and the monitoring control optical signal and detecting a phase difference therebetween, an optical amplifier for directly amplifying the optical signal and outputting the amplified optical signal and a dispersion compensator unit for automatically compensating a dispersion of the amplified optical signal.

Further, in the automatic dispersion compensation type optical transmission system according to the present invention, the dispersion compensator unit comprises a pair of light branching and confluence setting devices for branching an optical transmission line to a plurality (N) of branch lines and joining a plurality (N) of branch lines to a optical transmission line, a plurality (N) of DCF's having different dispersion compensating amounts and provided in the plurality (N) of the branch lines, respectively, and a control circuit for automatically selecting one of the DCF's having an optimal dispersion compensating amount according to a transmission distance by controlling the light branching and confluence setting devices according to a phase difference between the optical main signal and the monitoring control optical signal.

Further, according to the present invention, the light branching and confluence setting devices of the automatic dispersion compensation type optical transmission system may comprise optical matrix switches provided on an input side and an output side of the DCF's, respectively, or an optical matrix switch provided on the input side of the DCF's and an optical coupler provided on the output side of the DCF's.

In addition, according to the present invention, the repeater of the light branching and confluence setting devices of the automatic dispersion compensation type optical transmission system which comprise optical matrix switches provided on an input side and an output side of the DCF's, respectively, or an optical matrix switch provided on the input side of the DCF's and an optical coupler provided on the output side of the DCF's may be a linear repeater or a regenerative repeater.

In the automatic dispersion compensation type optical transmission system of the present invention, there is a difference in propagation rate between transmission lines due to the fact that the wavelengths of the optical main signal produced in the optical transmitting unit and the monitoring control optical signal are different from each other. Due to such difference of the propagation rate, a phase difference is provided between the low frequency pulse signals multiplexed with the optical main signal and the monitoring control optical signal, respectively. Therefore, in the repeater, a distance of a transmission section is specified by detecting the phase difference by the phase difference detector circuit and, in the dispersion compensating unit, the light branching and confluence setting devices having the DCF's having different dispersion compensation amounts therebetween are controlled by the control circuit on the basis of a phase difference information. Thus, even when the dispersion compensation amount is changed by a change of the transmission line, the transmission line can be switched to one of the DCF's which has an optimal dispersion compensation amount, making an optimal dispersion compensation possible. Therefore, in the automatic dispersion compensation type optical transmission system according to the present invention, even when the required dispersion compensation amount is changed by a switching of the transmission line, an automatic dispersion compensation becomes optimal.

The automatic dispersion compensation type optical transmission system according to the present invention will be described in detail with reference to preferred embodiments shown in the attached drawings.

DETAILED DESCRIPTION OF PREFERRED EMBODIMENTS

Embodiment 1

Figure 1:
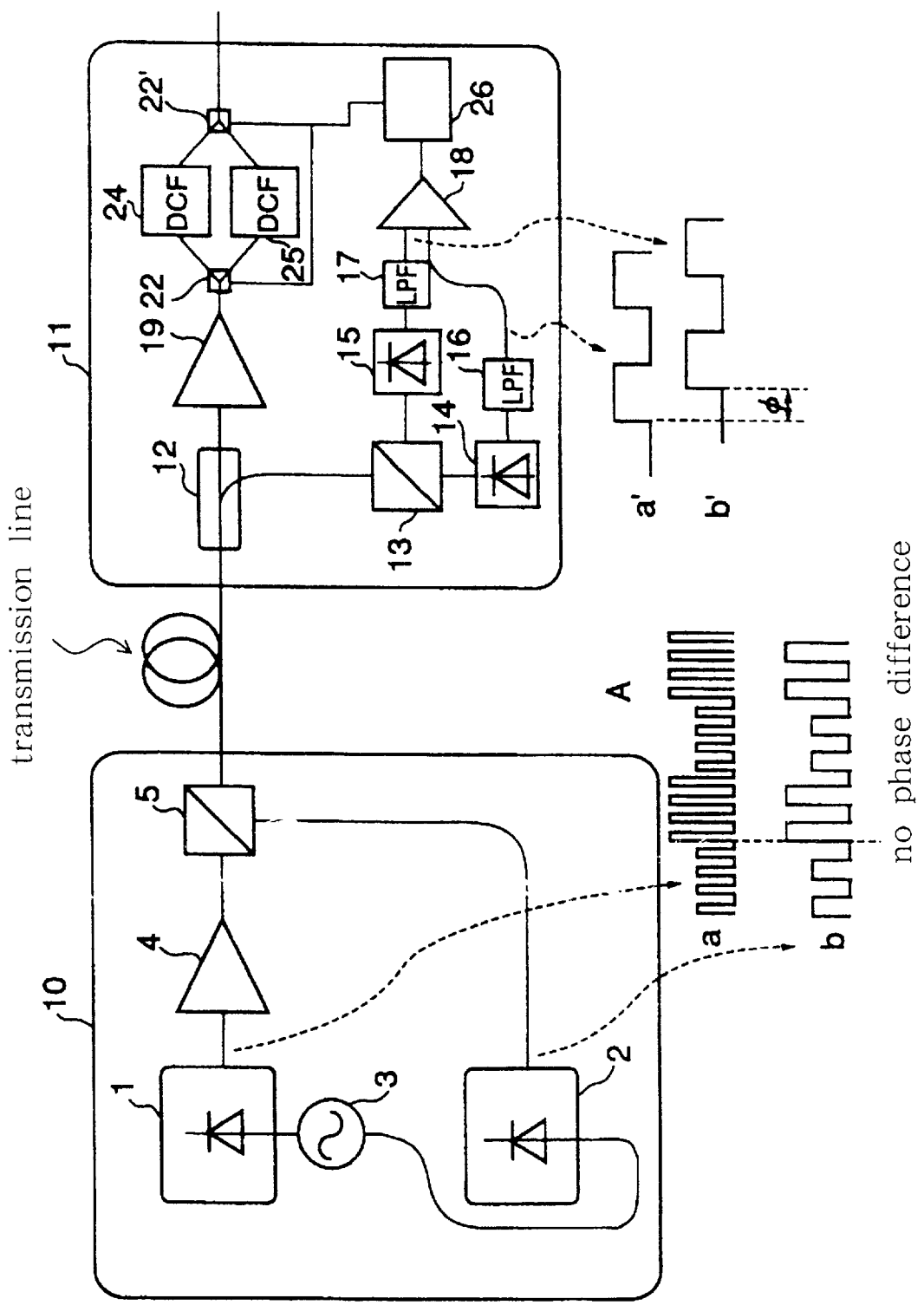
FIG. 1 shows a basic construction of an automatic dispersion compensation type optical transmission system according to a first embodiment of the present invention and waveforms of processing signals at main portions thereof.

FIG. 1 shows a basic construction of an automatic dispersion compensation type optical transmission system according to a first embodiment of the present invention and waveforms of processing signals at main portions thereof.

The automatic dispersion compensation type optical transmission system is basically composed of an optical transmitting unit 10 for transmitting an optical signal to a transmission line and a linear repeater 11 for directly amplifying the optical signal transmitted from the transmission line.

The optical transmitting unit 10 includes an optical transmitter 1 for transmitting an optical main signal a and an optical transmitter 2 for transmitting a monitoring control optical signal b, a low frequency signal multiplexing circuit 3 for multiplexing low frequency pulse signals each synchronized with the optical main signal a and the monitoring control optical signal b, an optical preamplifier 4 for directly amplifying the optical main signal a and outputting the amplified optical main signal and a WDM coupler 5 for wavelength-synthesizing the amplified optical main signal and the monitoring control optical signal b and outputting the synthesized signal as an optical signal.

The linear repeater 11 includes an optical coupler 12 for branching a portion of the optical signal transmitted from the optical transmitting unit 10 through the transmission line for use to detect a phase difference between the optical main signal a and the monitoring control optical signal b, a WDM coupler 13 for wavelength-separating the branched optical signal to the optical main signal a and the monitoring control optical signal b, opto-electric converter circuits 14 and 15 for converting the optical main signal a and the monitoring control optical signal b of the optical signal into electric signals, respectively, low-pass filters (LPF's) 16 and 17 for removing high frequency components of the opto-electrically converted optical main signal and the monitoring control optical signal, respectively, a phase difference detector circuit 18 for detecting a phase difference $\phi$ by extracting the low frequency pulse signals multiplexed in the low frequency multiplexing circuit 3 of the optical transmitting unit 10 from the low-pass filtered optical main signal a' and the monitoring control optical signal b', an optical amplifier 19 for directly amplifying the optical signal and outputting the amplified optical signal and a dispersion compensator unit for automatically compensating a dispersion of the amplified optical signal.

The dispersion compensator unit includes an optical branch setting device 22 optical matrix switch capable of branching a transmission line to a plurality (N) of branch lines, an optical confluence setting device 22' such a optical matrix switch arranged opposite to the optical branch setting device 22 and capable of joining the plurality (N) of branch lines to a transmission line, a plurality (N) of DCF's having mutually different dispersion compensating amounts and provided in the respective branch lines and a control circuit 26 for controlling the optical branch setting device 22 and the optical confluence setting device 22' to automatically select one of the DCF's having an optimal dispersion compensating amount corresponding to a transmission distance determined by the phase difference. In the shown embodiment, N is 2 and 2 DCF's 24 and 25 are provided.

In more detail, the optical transmitter 1 of the optical transmitting unit 10 may transmit the optical main signal having wavelength of 1.552 $\mu$m and the optical transmitter 2 may be transmits the monitoring control optical signal having wavelength of 1.520 $\mu$m. The optical main signal a and the monitoring control optical signal b which are multiplexed with the low frequency pulse signals are wavelength-synthesized by the WDM coupler 5 and the resultant optical signal is transmitted through the transmission line to the linear repeater 11. In this embodiment, it is assumed that the distance of the transmission section is 80 km which is generally used in the linear repeater and the transmission line is constituted with a usual 1.3 $\mu$m zero dispersion optical fiber (18 psec/nm/km).

On the other hand, for the linear repeater 11, since the wavelength dispersion of the optical signal propagated through the 1.3 $\mu$m zero dispersion fiber 80 km long starts in a wavelength range of 1.5 $\mu$m, there is a phase difference $\phi$=(18 psec/nm/km)×32 nm×80 km=46 nsec produced between the optical signal transmitted from the optical transmitter 1 and the monitoring control optical signal transmitted from the optical transmitter 2. One of the DCF's 24 and 25 which is suitable for the amount of dispersion compensation of the transmission line is selected by detecting this phase difference φ by means of the phase difference detector circuit 18 and controlling the opposite optical matrix switches 22 and 22' by means of the control circuit 26 of the dispersion compensator unit. Assuming that the DCF 24 is for 80 km and the DCF 25 is for 60 km, it is possible to automatically obtain the optimal dispersion compensation when the transmission distance is switched from 80 km to 60 km.

Embodiment 2

Figure 2:
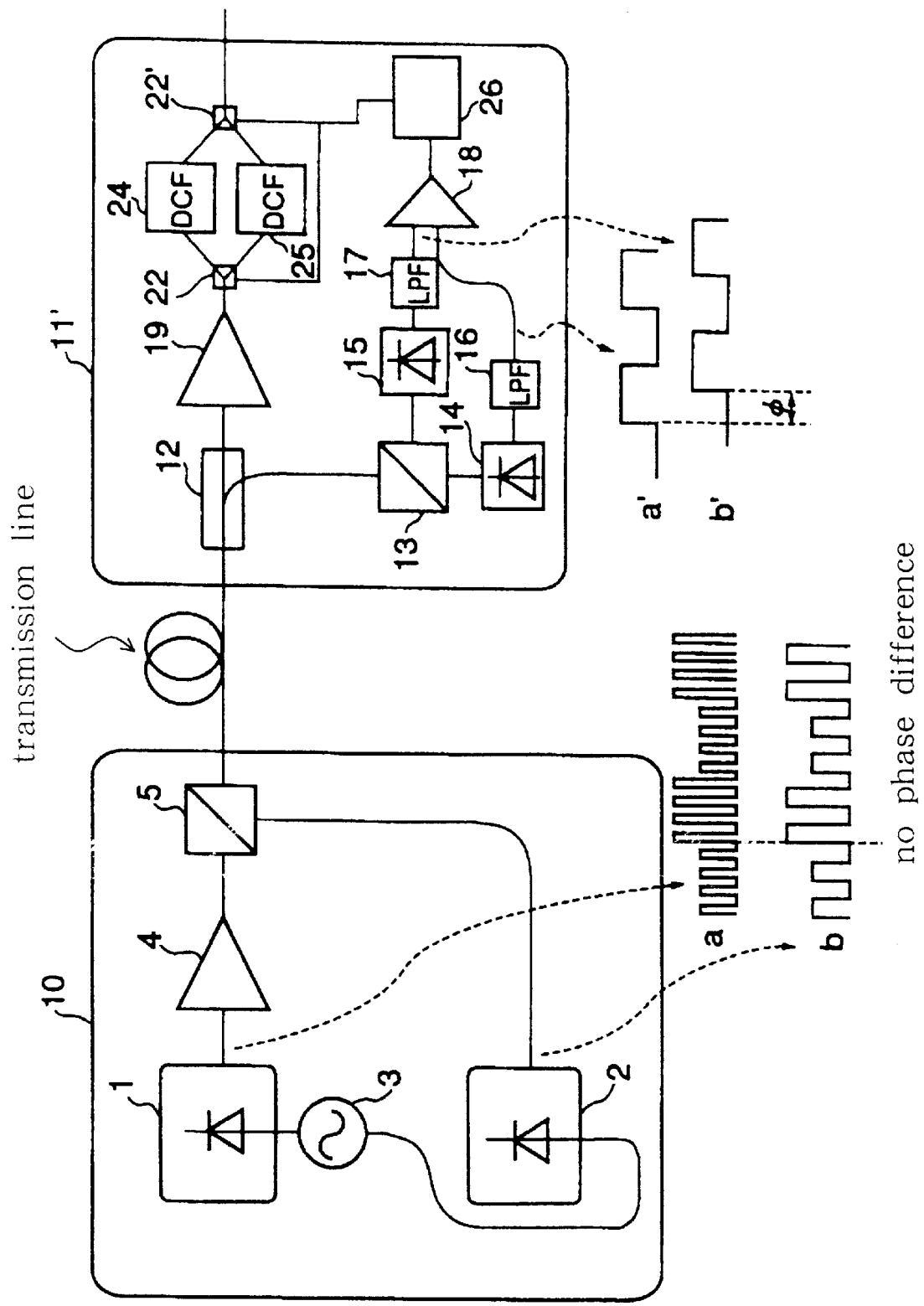
FIG. 2 shows a basic construction of an automatic dispersion compensation type optical transmission system according to a second embodiment of the present invention and waveforms of processing signals at main portions thereof.

FIG. 2 shows a basic construction of an automatic dispersion compensation type optical transmission system according to a second embodiment of the present invention and waveforms of processing signals at main portions thereof.

The automatic dispersion compensation type optical transmission system is basically composed of an optical transmitting unit 10 for transmitting an optical signal to a transmission line and a regenerative repeater 11' for directly amplifying the optical signal transmitted from the transmission line.

The optical transmitting unit 10 has the same construction as that of the first embodiment and the regenerative repeater 11' has a construction equivalent to the linear repeater 11 of the first embodiment.

Therefore, the automatic dispersion compensation type optical transmission system functions similarly to the system of the first embodiment and it is possible to automatically perform the optimal dispersion compensation.

Embodiment 3

Figure 3:
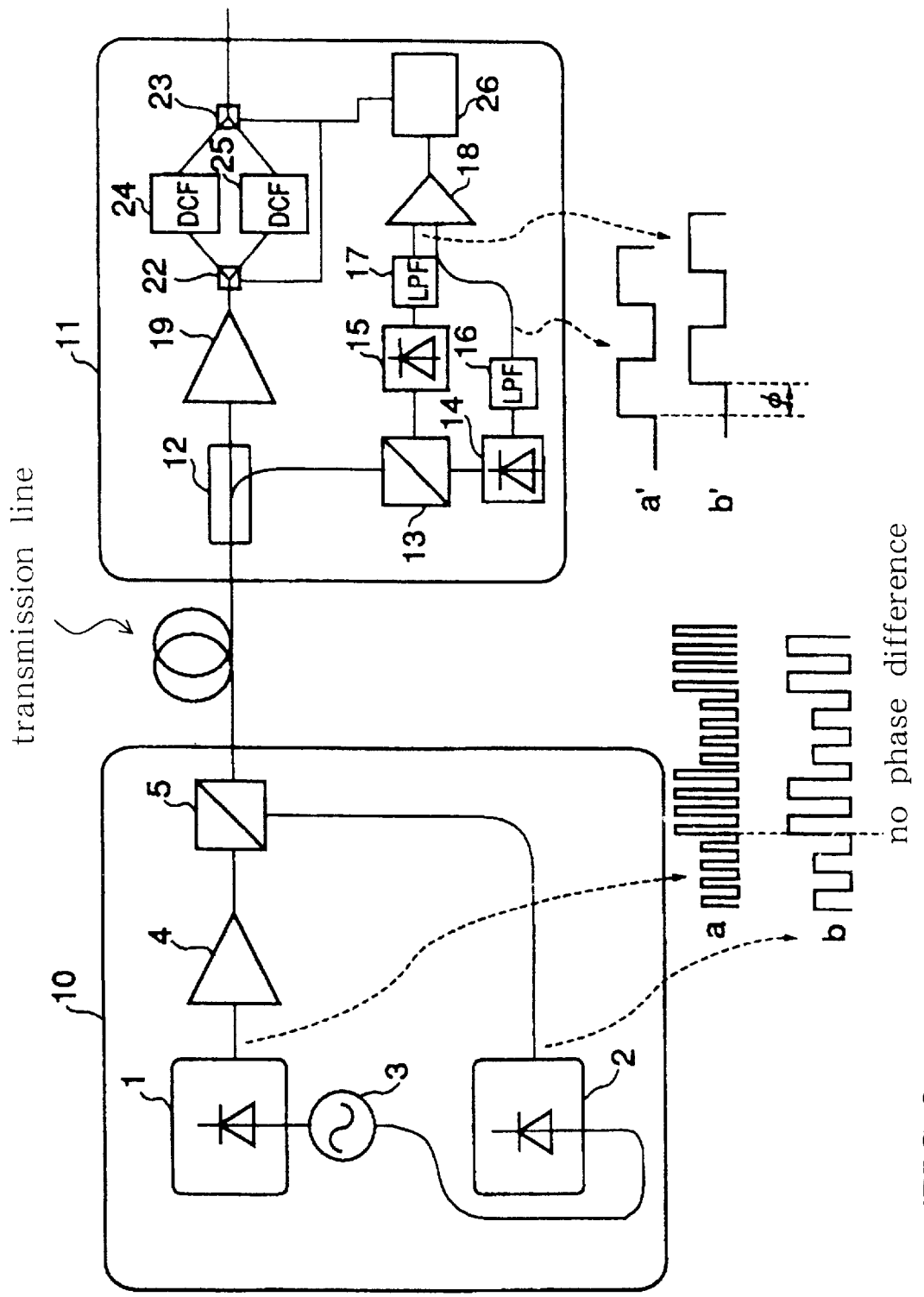
FIG. 3 shows a basic construction of an automatic dispersion compensation type optical transmission system according to a third embodiment of the present invention and waveforms of processing signals at main portions thereof.

FIG. 3 shows a basic construction of an automatic dispersion compensation type optical transmission system according to a third embodiment of the present invention and waveforms of processing signals at main portions thereof.

The automatic dispersion compensation type optical transmission system is basically composed of an optical transmitting unit 10 for transmitting an optical signal to a transmission line and a linear repeater 11 for directly amplifying the optical signal transmitted from the transmission line. The optical transmitting unit 10 is the same as that of the first embodiment and the linear repeater 11 has the same construction as that of the first embodiment except that the optical branching and confluence devices are an optical matrix switch 22 provided on the input side of the DCF's 24 and 25 and an optical coupler 23 provided on the output side thereof.

Therefore, the automatic dispersion compensation type optical transmission system of the third embodiment is capable of automatically perform the optimal dispersion compensation as in the first or second embodiment.

Embodiment 4

Figure 4:
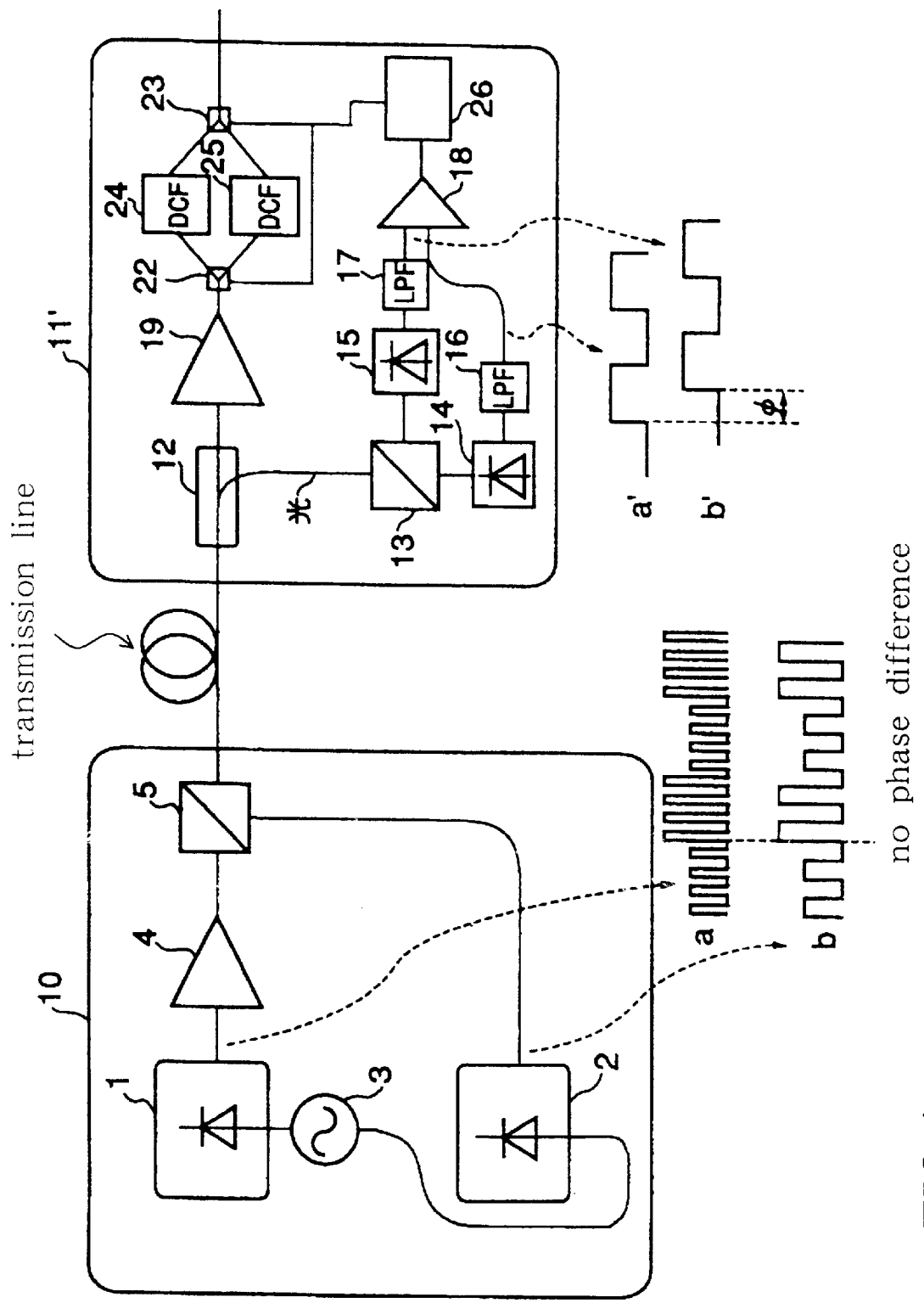
FIG. 4 shows a basic construction of an automatic dispersion compensation type optical transmission system according to a fourth embodiment of the present invention and waveforms of processing signals at main portions thereof.

FIG. 4 shows a basic construction of an automatic dispersion compensation type optical transmission system according to a fourth embodiment of the present invention and waveforms of processing signals at main portions thereof.

The automatic dispersion compensation type optical transmission system is basically composed of an optical transmitting unit 10 for transmitting an optical signal to a transmission line and a regenerative repeater 11' for directly amplifying the optical signal transmitted from the transmission line. The optical transmitting unit 10 is the same as that of the first embodiment and the regenerative repeater 11' has the same construction as that of the third embodiment.

Therefore, the automatic dispersion compensation type optical transmission system of the fourth embodiment is capable of automatically perform the optimal dispersion compensation as in the first to third embodiments.

Although the dispersion compensator unit of the automatic dispersion compensation type optical transmission system according to any of the first to fourth embodiments has been described as having the construction adaptable to N dispersion compensation amounts with N being 2, it is possible to expand the construction adaptable to three or more dispersion compensation amounts by increasing the number N of the branch lines and compensation regardless of transmission distance.

As described hereinbefore, since the automatic dispersion compensation type optical transmission system according to the present invention is provided with the dispersion compensator unit for automatically selecting one of the DCF's adaptable to a number of amounts of dispersion compensation, it is possible to set an optimal amount of dispersion compensation of the DCF according to a transmission section and further to easily adapt it to an automatic switching of transmission line.

I claim:

1. An automatic dispersion compensation type optical transmission system comprising:

an optical transmission unit for transmitting an optical signal to a transmission line, said optical transmission unit comprising:

optical transmitters for transmitting an optical main signal and a monitoring control optical signal, respectively;

a low frequency signal multiplexing circuit for multiplexing low frequency pulse signals each synchronized with the optical main signal and the monitoring control optical signal;

an optical preamplifier for directly amplifying the optical main signal and outputting the amplified optical main signal; and a WDM coupler for wavelength-synthesizing the amplified optical main signal and the monitoring control optical signal and outputting the synthesized signal as an optical signal; and a repeater for directly amplifying the optical signal; transmitted through said transmission line, said repeater comprising:

an optical coupler for branching a portion of the optical signal to detect a phase difference between the optical main signal and the monitoring control optical signal;

a WDM coupler for wavelength-separating the branched optical signal to the optical main signal and the monitoring control optical signal;

opto-electric converter circuits for converting the optical main signal and the monitoring control optical signal of the optical signal into electric signals, respectively;

a phase difference detector circuit for extracting the low frequency pulse signals multiplexed in said optical transmitting unit from the opto-electrically converted optical main signal and the monitoring control optical signal and detecting a phase difference therebetween;

an optical amplifier for directly amplifying the optical signal and outputting the amplified optical signal; and a dispersion compensator unit for automatically compensating a dispersion of the amplified optical signal.

2. An automatic dispersion compensation type optical transmission system as claimed in claim 1, wherein said dispersion compensator unit comprises a pair of light branching and confluence setting devices for branching an optical transmission line to a plurality (N) of branch lines and joining a plurality (N) of branch lines to an optical transmission line, a plurality (N) of DCF's having different dispersion compensating amounts and provided in the plurality (N) of said branch lines, respectively, and a control circuit for automatically selecting one of said DCF's having an optimal dispersion compensating amount according to a transmission distance by controlling said light branching and confluence setting devices according to a phase difference between the optical main signal and the monitoring control optical signal, where N is an integer larger than 1.

3. An automatic dispersion compensation type optical transmission system as claimed in claim 2, wherein said light branching and confluence setting devices comprises optical matrix switches provided on an input side and an output side of said DCF's, respectively.

4. An automatic dispersion compensation type optical transmission system as claimed in claim 2, wherein said light branching and confluence setting devices comprises an optical matrix switch provided on an input side of said DCF's and an optical coupler provided on an output side of said DCF's.

5. An automatic dispersion compensation type optical transmission system as claimed in any of claims 1 to 4, wherein said repeater comprises a linear repeater or a regenerative repeater.

* * * * *

UNITED STATES PATENT AND TRADEMARK OFFICE
CERTIFICATE OF CORRECTION

PATENT NO. : 6,055,082
DATED : April 25, 2000
INVENTOR(S) : Tadayuki Chikuma, et al.

It is certified that error appears in the above-identified patent and that said Letters Patent is hereby corrected as shown below:

<u>Title page,</u>
Item [56] References Cited, U.S. PATENTS DOCUMENTS:
"4/1998 Cohen et al. 11/1990 Mochizuki et al." should read
-- 11/1990 Cohen et al.  4/1998 Mochizuki et al.

<u>Column 6,</u>
Line 12, "and compensation regardless of transmission distance" should read
-- and hence the DCF's. In any case, it is possible to perform the optimal dispersion compensation regardless of transmission distance --

Signed and Sealed this

Eighteenth Day of September, 2001

*Attest:*

*Nicholas P. Godici*

*Attesting Officer*

NICHOLAS P. GODICI
*Acting Director of the United States Patent and Trademark Office*